SATIN FINISH VITRIFIABLE ENAMELS
Filed June 1, 1965
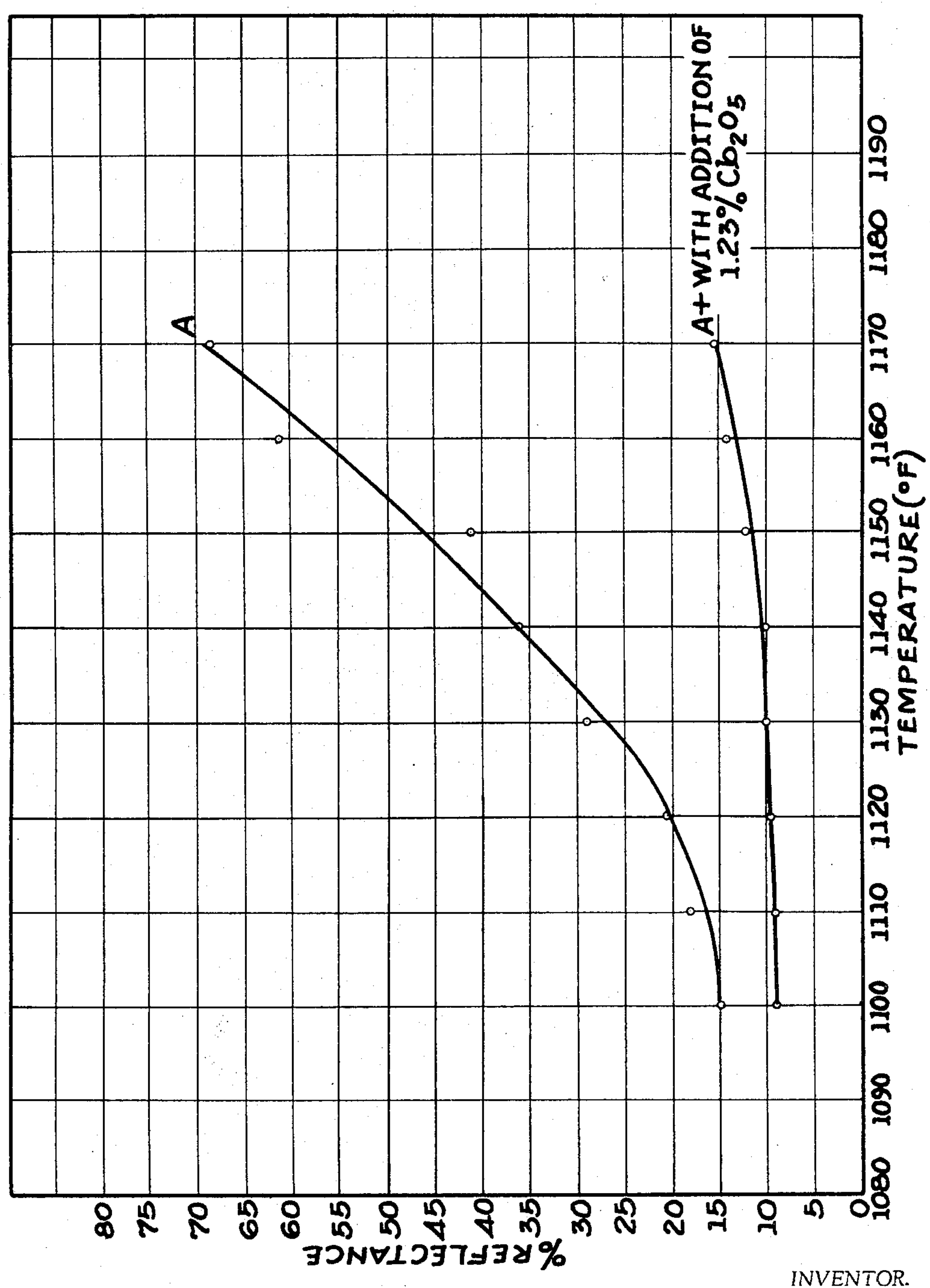
INVENTOR.
RAYMOND S. KOSIOREK
BY
Brown, Critchlow, Flick & Peckham
his ATTORNEYS.

United States Patent Office 3,404,027

Patented Oct. 1, 1968

1

3,404,027

SATIN FINISH VITRIFIABLE ENAMELS

Raymond Kosiorek, Bridgeville, Pa., assignor, by mesne assignments, to Hercules Incorporated, a corporation of Delaware Filed June 1, 1965, Ser. No. 460,223
2 Claims. (Cl. 117—124)

ABSTRACT OF THE DISCLOSURE

Satin finish enamels for glassware are provided by vitrifiable fluxes containing by weight, lead oxide 50 to 65 percent, silica 25 to 35 percent, boric oxide 2 to 10 percent, sodium oxide 0.5 to 4 percent, titanium dioxide 0 to 8 percent, lithium oxide 0 to 3 percent, zirconium oxide 0 to 5 percent, to which in accordance with the invention there is added as mill additions, by weight, about 0.1 to 4 percent of columbium oxide and from about 10 to 30 percent of aluminum oxide or titanium dioxide as a matting agent.

Vitrifiable enamels capable of developing on glassware what is termed a satin finish are known in the ceramic trade. They are in demand for decorating a variety of glass articles such as tumblers and related tableware items, cosmetic containers, bottles for various liquids, and a variety of other glass products, such as sheet glass carrying on one face a layer of a virtifiable satin finish enamel.

The satin finish vitrifiable enamels require a particular degree of mattness. Those used for the foregoing and other purposes up to the time of this invention have been characterized by the fact that the degree of gloss varies in proportion with the firing temperature. That is, there is for a given enamel a relatively narrow range of firing temperature which will be productive of the slight sheen desired with such an enamel. However, if the enamel is underfired the surface is extremely dull while over firing causes it to become objectionably glossy for the purposes for which satin finish enamels are intended. This situation creates a problem in the glass factory in that the loads in the decorating lehrs vary widely so that a constant problem has been to produce satin finish enamelware of uniform texture owing to the aforesaid sensitivity of the enamels to temperature. Stated otherwise, the temperature in different parts of a given lehr may vary widely as a result of differences in loading or differences in glass mass with consequent lack of uniformity of satin finish enamelwares.

The primary object of the present invention is to provide vitrifiable glass enamels productive of satisfactory satin finish which are stabilized against the effect of temperature on the degree of mattness and are thus productive of uniform surface texture and sheen over a broad range of firing temperatures, which are of simple and inexpensive composition, which are easily produced by standard vitrifiable enamel techniques, and which may be applied to glass articles and fired in accordance with customary glass decorating practices.

Another object is to provide satin finish enameled glass articles made from vitrifiable enamels in accordance with the foregoing object.

Other objects will be recognized from the following specification.

The invention may be described with reference to the accompanying drawing in which one graph represents the

2 effect of temperature upon the reflectance of a particular satin finish enamel while the other graph is representative of the results attained by the application of the present invention to the same enamel.

The invention is predicated in large part upon my discovery that its stated objects are achieved by a mill addition of a small amount of columbium oxide ($Cb_2O_5$) to conventional lead borosilicate vitrifiable glass enamels, or fluxes, having also admixed mill additions of refractory materials capable of producing a matte finish in the fired enamel surface. These compositions with columbium oxide I have found, by actual experience, produce when fired vitrified films or coatings the surface reflectance of which provides the desired satin finish and sheen and the surface reflectance of which is remarkably uniform over a wide range of firing temperatures. In other words, with my new compositions it is now possible to produce satin finish enameled glass articles of uniform surface texture irrespective of the loading conditions in the decorating lehrs.

The vitrifiable fluxes used in the practice of the invention are preferably of the following composition in proportions by weight:

| | Percent |
|---|---|
| Lead oxide | 50–65 |
| Silica | 25–35 |
| Boric oxide | 2–10 |
| Sodium oxide | 0.5–4 |
| Titanium dioxide | 0–8 |
| Lithium oxide | 0–3 |
| Zirconium oxide | 0–5 |

If the enamel contains more than about 10 percent of boric oxide it should also contain from about 3 to 5 percent of aluminum oxide to prevent separation of some of the boric oxide from solution with a consequent objectionable rise in the coefficient of expansion of the flux.

These fluxes are prepared in accordance with standard vitrifiable glass enamel practice by melting them and water cracking the melt. In preparing the water cracked material for use there is added aluminum oxide or titanium dioxide as a mill addition (i.e., not melted into the flux) in an amount to give the desired matte in the fired enamel. The amount of these matting materials will vary depending upon the particular composition of the flux and its intended use but in general for glassware decoration there may be used about 19 to 25 percent by weight.

In accordance with the invention there is added to the water-cracked flux and the matting agent about 0.1 to 4 percent by weight of columbium oxide as a mill addition, and the whole is then ball milled to pass a 325 mesh screen. If it be desired that the enamel be other than white there may be added to the charge to the ball mill any of the various coloring pigments used for that purpose in the enamel trade; these coloring ingredients have no effect other than of color and so unlike those described above are not essential for the purposes of the invention.

As exemplifying the invention reference may be made to the following fluxes based upon batch compositions which have been found to accomplish the purposes of the invention:

FLUX A

| | |
|---|---|
| Lead oxide | 54.7 |
| Silica | 34.3 |
| Boric oxide | 2.6 |
| Sodium oxide | 2.7 |
| Titanium dioxide | 4.0 |
| Lithium oxide | 0.8 |
| Zirconium oxide | 0.8 |

FLUX B

| | |
|---|---|
| Lead oxide | 54.6 |
| Silica | 33.2 |
| Sodium oxide | 2.0 |
| Boric oxide | 3.3 |
| Titanium dioxide | 4.5 |
| Lithium oxide | 1.2 |
| Zirconium silicate | 1.2 |

FLUX C

| | |
|---|---|
| Lead oxide | 58.2 |
| Silica | 31.3 |
| Sodium oxide | 2.5 |
| Boric oxide | 3.9 |
| Titanium dioxide | 3.4 |
| Lithium oxide | 0.8 |

50 parts by weight of Flux A having mill additions of 15 parts by weight of alumina and 0.4 part by weight of columbium oxide was productive of a good satin white for the decorating of tumblers. Similarly, 60 parts by weight of Flux C having as mill additions 15 parts of titanium dioxide, and 1.2 parts of columbium oxide, and about 4 parts by weight of grey pigment has been found to be satisfactory for providing glass block with grey enamel. 60 parts by weight of Flux B having as mill additions 22 parts by weight of calcined alumina and 0.5 part of columbium oxide together with about 11 parts by weight of pigments contributing a green color to the fired enamel has proved to be outstandingly good for the production of colored sheet glass produced by spraying this enamel composition onto ¼ inch plate glass and passing the sheet through a tempering furnace in which the two faces of the glass are heated up to about 1400° F. and then chilled with a blast of cold air. This treatment both fires the enamel in place and also strengthens the glass.

In accordance with the provisions of the patent statutes, the principle of the invention has been explained and there has been described what is now considered to represent its best embodiment. However, it should be understood that, within the scope of the appended claims, the invention may be practiced otherwise than as specifically described.

I claim:

1. As a new article of manufacture, a glass article having fused to a surface thereof a satin finish enamel consisting essentially of by weight (1) a vitrifiable flux:

| | Percent |
|---|---|
| Lead oxide | 50–65 |
| Silica | 25–35 |
| Boric oxide | 2–10 |
| Sodium oxide | 0.5–4 |
| Titanium dioxide | 0–8 |
| Lithium oxide | 0–3 |
| Zirconium oxide | 0–5 |

mechanically admixed with (2) 0.1 to 4 percent by weight of columbium oxide and about 10 to 30 percent by weight of a matting agent selected from the group consisting of aluminum oxide and titanium dioxide in an amount to produce a matte finish on the fired enamel.

2. An article according to claim 1, said flux consisting essentially of:

| | |
|---|---|
| Lead oxide | 54.6 |
| Silica | 33.2 |
| Sodium oxide | 2.0 |
| Boric oxide | 3.3 |
| Titanium dioxide | 4.5 |
| Lithium oxide | 1.2 |
| Zirconium silicate | 1.2 |

References Cited

UNITED STATES PATENTS

| | | | |
|---|---|---|---|
| 2,396,873 | 3/1946 | Morrison et al. | 117—124 X |
| 2,663,658 | 12/1953 | Schurecht | 117—124 X |
| 2,668,783 | 2/1954 | Migley | 117—124 |

RALPH S. KENDALL, *Primary Examiner.*

W. F. CYRON, *Assistant Examiner.*